United States Patent [19]
Ashizawa

[11] Patent Number: 5,869,917
[45] Date of Patent: Feb. 9, 1999

[54] VIBRATION ACTUATOR

[75] Inventor: Takatoshi Ashizawa, Kawasaki, Japan

[73] Assignee: Nikon Corporation, Tokyo, Japan

[21] Appl. No.: 659,828

[22] Filed: Jun. 7, 1996

[30] Foreign Application Priority Data

Jun. 7, 1995 [JP] Japan ................................. 7-140654

[51] Int. Cl.$^6$ .................................................. H02N 2/00
[52] U.S. Cl. .......................................... 310/323; 310/333
[58] Field of Search .................................. 310/323, 325, 310/333, 369

[56] References Cited

U.S. PATENT DOCUMENTS

| | | | |
|---|---|---|---|
| 4,947,076 | 8/1990 | Kumada | 310/323 |
| 4,965,482 | 10/1990 | Ohnishi et al. | 310/323 |
| 5,051,647 | 9/1991 | Uchikawa et al. | 310/323 |
| 5,410,204 | 4/1995 | Imbayashi et al. | 310/323 |
| 5,600,196 | 2/1997 | Tamai | 310/323 |

FOREIGN PATENT DOCUMENTS

| | | | |
|---|---|---|---|
| 0 674 350 | 9/1995 | European Pat. Off. | 310/323 |
| 0 696 072 | 2/1996 | European Pat. Off. | 310/323 |
| 8-140377 | 5/1996 | Japan | 310/323 |

OTHER PUBLICATIONS

U. S. application No. 08/391,464, Takagi et al., filed Feb. 21, 1995.

U. S. application No. 08/408,305, Takagi et al., filed Mar. 22, 1995.

*Primary Examiner*—Thomas M. Dougherty

[57] ABSTRACT

An ultrasonic vibration actuator on which polishing treatment of the driving surface of the elastic member can easily be performed, and which can be accurately assembled. The ultrasonic vibration actuator is equipped with a support member, and an elastic member, which is established about the external surface of the support member and in addition maintains piezoelectric elements. The elastic member generates a driving force in a driving surface which is an end surface thereof, and a relative moving member, which is in compressive contact with the elastic member at the driving surface, is caused to move. Fixing members, which penetrate the support member and the elastic member and which fix the support member and the elastic member, are also provided. The support member, in a position including a plane between the driving surface and the fixing member, is freely separable into a first support member and a second support member.

18 Claims, 10 Drawing Sheets

RANGE OF PRESENCE OF SUPPORT MEMBER SEPARATION SURFACE

FIG.6(A) t=0 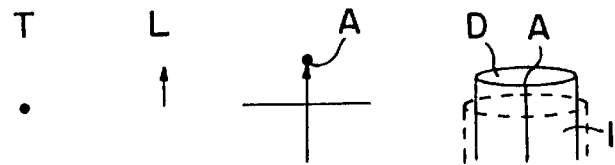
FIG.6(B) t=(1/4)π 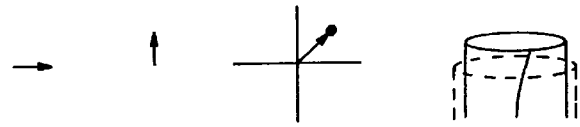
FIG.6(C) t=(2/4)π 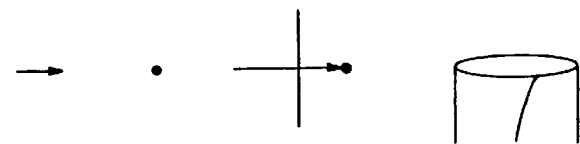
FIG.6(D) t=(3/4)π 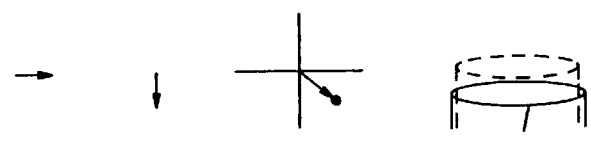
FIG.6(E) t=(4/4)π 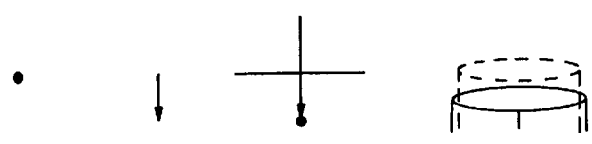
FIG.6(F) t=(5/4)π 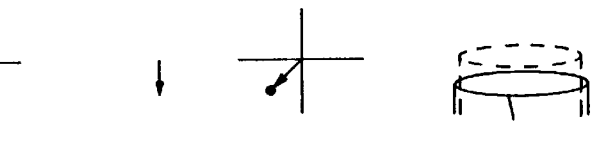
FIG.6(G) t=(6/4)π 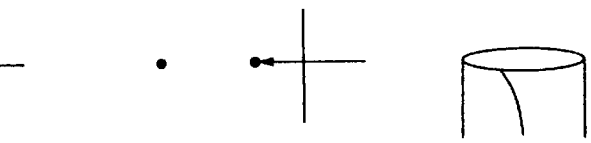
FIG.6(H) t=(7/4)π 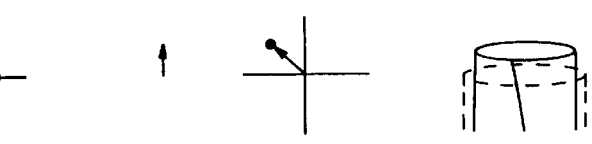

VIBRATION ACTUATOR

CROSS REFERENCE TO RELATED APPLICATIONS

This application is based upon and claims priority from Japanese Patent Application No. 07-140654 filed Jun. 7, 1995, the contents of which are hereby incorporated herein by reference.

BACKGROUND OF THE INVENTION

1. Field of the Invention

The present invention relates, in a vibration actuator represented by an ultrasonic motor, to a vibration actuator in which two vibrational modes are used, for example, a longitudinal vibration and a torsional vibration. In particular, the present invention relates to a vibration actuator having an improved construction and to a method of forming same.

2. Description of the Related Art

FIG. 13 is an oblique view showing a conventional vibration actuator of the type using a longitudinal vibration and a torsional vibration.

Heretofore, in this kind of vibration actuator, the stator (fixed element) 101 comprises a piezoelectric element 104 for torsional vibration, disposed between two columnar type vibration elements 102, 103. Moreover, a piezoelectric element 105 for longitudinal vibration is arranged at the upper side of the vibration element 103. The piezoelectric element 104 for torsional vibration is polarized in the circumferential direction, while the piezoelectric element 105 for longitudinal vibration is polarized in the thickness direction. Furthermore, a rotor (moving element) 106 is disposed on the upper side of the piezoelectric element 105 for longitudinal vibration.

The vibration elements 102, 103 and piezoelectric elements 104, 104 which constitute the stator 101 are fixed by means of threaded retention on the threaded portion of a shaft 107. The rotor 106 is rotatably disposed on the shaft 107 via ball bearings 108. A nut 110 is screw retained on the end of the shaft 107 via a spring 109, causing the rotor 106 to be in compressive contact with the stator 101 with a compressive force F.

The piezoelectric element 104 for torsional vibration and the piezoelectric element 105 for longitudinal vibration are driven by a voltage, phase controlled by means of a phase shifter 112, oscillating at the same frequency, as that supplied from the oscillator 111.

The piezoelectric element 104 for torsional vibration incurs a mechanical deformation in order to rotate the rotor 106. On the other hand, the piezoelectric element 105 for longitudinal vibration, via a frictional force acting between the stator 101 and the rotor 106, plays a clutch-like role in converting vibration to unidirectional motion, by means of causing periodic vibration synchronously with the period of the torsional vibration due to the piezoelectric element 104.

FIG. 14 is an oblique exploded view of the stator of the conventional vibration actuator.

It is necessary to polarize in the circumferential direction the piezoelectric element 104 for torsional vibration. Because of this, the piezoelectric material, as shown in FIG. 14, once divided into about six to eight fan-shaped pieces, and after each piece had been polarized, they were reassembled into a ring. Moreover, element 104a is an electrode.

However, in the conventional vibration actuator, when assembling the piezoelectric element 104 for torsional vibration into a ring, it was difficult to provide shape accuracy.

On the other hand, the areas of the piezoelectric element 105 for longitudinal vibration and the piezoelectric element 104 for torsional vibration, were both about equal to the cross sectional area of the stator 106, or, were smaller than the cross sectional area of the stator 106. Moreover, it was necessary to open a hole in the respective centers of the piezoelectric element 105 for longitudinal vibration and the piezoelectric element 104 for torsional vibration, in order for the shaft 107 to pass therethrough. Because of this, the respective areas of the piezoelectric element 105 for longitudinal vibration and the piezoelectric element 104 for torsional vibration became further reduced, and it became difficult to attain both high torque and high rotation of a vibration actuator.

In order to solve such problems, the present assignee has already disclosed, in Japanese Patent Application 6-275022, a type of vibration actuator which uses longitudinal vibrations and torsional vibrations and which can drive at high torque and high rotation, and which moreover is of simple structure and simple to manufacture.

FIG. 15 is a cross sectional diagram showing the structure of this vibration actuator. In FIG. 15, a cylindrical elastic member 202 is arranged in the outer circumferential surface of a rod-shaped fixed shaft 201 which has a large diameter portion 201a in the center. The elastic member 202 is threadingly held in the large diameter portion 201a by means of mounting bolts 203a, 203b.

The elastic member 202 is constituted by bringing about the assembly of two thick walled semicylindrical elastic members 202a, 202b. In the junction surface between the elastic bodies, two piezoelectric elements for torsional vibration using a piezoelectric constant $d_{15}$ and two piezoelectric elements for longitudinal vibration using a piezoelectric constant $d_{31}$ (both not shown in the drawing) are superposed. Thus a total of four piezoelectric elements are present.

A moving member (relative moving member) 205 is in contact with the driving surface D which is the upper end face of the elastic body 202. This moving member 205 is disposed to rotate freely on the fixed shaft 201 by means of a bearing 204 arranged in the center.

The moving member 205 is constituted by a moving member base material 205a and a sliding member 205b which is in contact with the drive surface D of the elastic member 202. By means of the bearing 204 which has been fitted into its inner circumference, the moving member 205 is then located with respect to the fixed shaft 201.

Moreover, the moving member 205 is in contact, in a compressed state, with the drive surface D of the elastic member 202, due to a compression member 206 which is a disc spring, a coil spring, or a plate spring. By this means, while driving as a vibration actuator, it is such that shaft vibration is not generated. This fixed shaft 201 has a threaded portion 201b formed at the front end thereof. An adjustment member 207, which is a nut or the like to regulate the amount of compression of the compression member 206, is held by means of screw threading onto the other end of fixed shaft 201.

A vibration actuator which has been constituted in this manner is excited by means of an impressed drive voltage from drive voltage elements (not shown in the drawing) or a drive voltage source (not shown in the drawing). Torsional vibrations and longitudinal vibrations are generated in the elastic member 202. When the resonant frequencies of the torsional vibration and the longitudinal vibration are about in agreement, torsional vibrations and longitudinal vibrations arise synchronously (that is, degeneracy), and elliptic motion arises in the drive surface D. This elliptic motion consists of a drive force, and the moving element 205 which is in compressive contact revolves around the fixed shaft 201.

However, the size of the locus of the elliptic motion which arises in the drive surface D of the elastic member 202 is about 1–2 μm. Because of this, for the elliptic motion generated in the drive surface D of the elastic member 202, in order to drive the moving element 205, to reliably reach the moving element 205 with which member 202 makes compressive contact, it is necessary to control to a predetermined surface roughness the drive surface D of the elastic member 202. This is done by, for example, performing lapping treatment or the like polishing or grinding treatment.

However, as shown in FIG. 15, the elastic member 202 is constituted as two assembled semicylindrical elastic members 202a, 202b. Because of this, the polishing or grinding treatment of the drive surface D, in order to obtain a predetermined surface roughness, is necessarily performed after the assembly of the elastic member 202.

Namely, in order to perform the polishing or grinding treatment of the drive surface D of the elastic member 202 of the vibration actuator shown in FIG. 15, the following steps from (1) through (6) are required.

(1) Four piezoelectric elements are interposed between elastic members, and in addition, in a state with adhesive caused to be interposed, the semicylindrical elastic members 202a, 202b are arranged opposite one another in the periphery of the fixed shaft 201.
(2) The semicylindrical elastic members 202a, 202b are fixed by mounting bolts 203a, 203b. The semicylindrical elastic members 202a, 202b and the piezoelectric elements are then adhered together.
(3) After adhesion, the mounting bolts 203a, 203b are removed, the elastic member 202 is pulled out from the fixed shaft 201.
(4) Polishing or grinding treatment of the drive surface D of the elastic member 202 is performed.
(5) After the polishing or grinding has ended, the elastic member 202 is mounted on the fixed shaft 201. It is again fixed by the mounting bolts 203a, 203b.
(6) The moving member 205 and the like are mounted on the fixed shaft 201.

Moreover, there is a risk that the adhesive, in order to adhere the piezoelectric elements and the semicylindrical elastic members 202a, 202b, could get around the mounting bolts 203a, 203b. In this case, in the process step (3), the mounting bolts 203a, 203b cannot be removed. To prevent this, for example, it is also necessary for the threads of the mounting bolts 203a, 203b to be coated with silicone oil or a similar adhesion prevention measure, and the process becomes complicated.

In this manner, in the vibration actuator proposed by Japanese Patent Application 6-275022, a large number of process steps are required, including grinding or polishing the drive surface D of the elastic member 202, and there is a risk of the process impeding mass production.

Furthermore, in the aforementioned method, when reassembling the support member 201 and the elastic body after polishing or grinding of the drive surface D, it is difficult to set the angle between the support member 201 and the drive surface D correctly at 90°. Because of this, a skew arises between the drive surface D and the moving member 205, the drive force or driving effect is reduced, and the occurrence of noise and similar problems arise.

SUMMARY OF THE INVENTION

Accordingly, it is an object of the present invention to solve the above problems.

It is a further object of the present invention to provide a vibration actuator in which the polishing or grinding process of the elastic member can be easily performed.

Yet a further object of the present invention is to provide a vibration actuator which can be correctly assembled.

An additional object of the present invention is to provide a vibration actuator in which no skew of the moving element occurs.

Objects of the present invention are achieved by a vibration actuator comprising a rod shaped support member having an outer surface; an elastic member disposed on the outer surface of the support member, causing generation of driving force in a driving surface which is an end surface of the elastic member; an electromechanical converting element which converts electrical energy, excited by means of drive signals, into mechanical energy, and which is supported by the elastic member; a relative moving member which contacts in a compressed state the driving surface of the elastic member; and a fixed member which fixes the support member and the elastic member, and penetrates the support member and the elastic member; wherein the support member is freely separated into at least two pieces, in a position including of plane containing the driving surface, or in a position in a plane between the driving surface and the fixed member.

In this case, the elastic member includes a plurality of rod shaped members which are joined together. At least a portion of the electromechanical converting element is formed of a thin plate shape, and also is located in a state interposed in joint surfaces of the elastic member.

Moreover, the respective end portions of the separated two support members can be formed thicker than the other portions.

After the elastic member has been assembled and arranged in the outer circumferential portion of the rod-shaped support member, the support member positioned on the relative movement member side can separate. Because of this, without pulling the elastic member off the support member, without any obstruction getting in the way, only the drive surface can be caused to be positioned on the same flat surface.

Moreover, the respective ends of the separated two support members, by being formed thicker than other portions, allow for an increase to be brought about in the fixed torque during driving of the vibration actuator.

Objects of the present invention are also achieved by a method of manufacturing a vibrational actuator including a fixed shaft which has been constructed by screw threaded retention of a first fixed shaft and a second fixed shaft that join at a joining face, elastic members, which are disposed with a plurality of piezoelectric elements in an interposed state between contact portions thereof, and a moving member contacting the elastic member at a driving surface, the method comprising the steps of: coating adhesive on the contact portions of the piezoelectric elements and the elastic members; fixing and adhering the elastic members and the piezoelectric elements; mounting the elastic members and piezoelectric elements to the second fixed shaft; rotating the first fixed shaft so as to withdraw the first fixed shaft from the second fixed shaft, the level of the joining face being below the driving surface; polishing or grinding the driving face to be of a predetermined surface roughness; and mounting the moving member on the elastic member with the first fixed shaft at a center of the moving member.

Additional objects and advantages of the invention will be set forth in part in the description which follows and, in part, will be obvious from the description, or may be learned by practice of the invention.

BRIEF DESCRIPTION OF THE DRAWINGS

These and other objects of the present invention, as well as economies of manufacture and manufacturing methods, will become apparent to those skilled in the art to which the invention pertains from a study of the following detailed description of the preferred embodiments and a study of the appended claims and drawings, all of which form a part of this application. In the drawings:

FIGS. 6(A)–6(H) are diagrams which illustrate an elliptic motion brought about in the drive surface by the combination of a longitudinal vibration and a torsional vibration in the elastic body of a vibration actuator according to the first embodiment;

DESCRIPTION OF THE PREFERRED EMBODIMENTS

Figure 1:
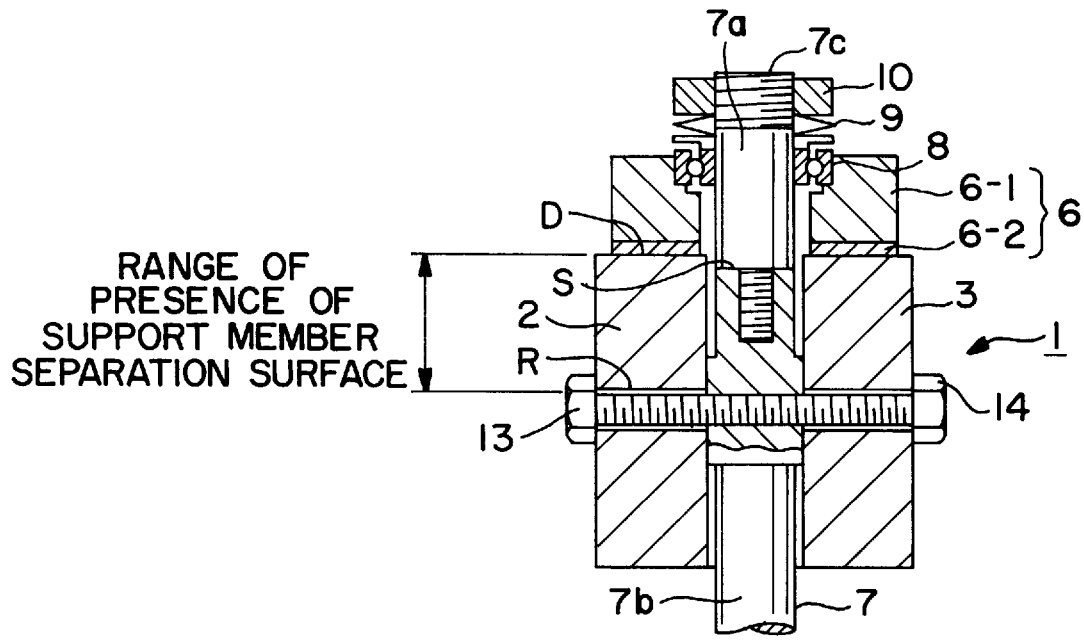
FIG. 1 is a cross sectional drawing showing a first embodiment of a vibration actuator according to the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

First Embodiment

Figure 2:
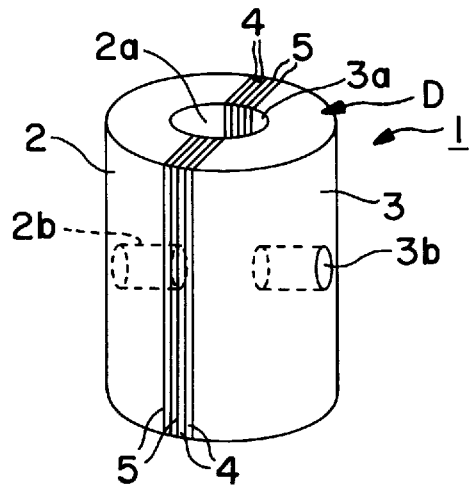
FIG. 2 is an oblique view showing an elastic member which is a fixed member used in the vibration actuator shown in FIG. 1.

FIG. 1 is a cross sectional drawing showing a first embodiment of a vibration actuator according to the present invention. FIG. 2 is an oblique view showing an elastic member which constitutes a vibration member used in the vibration actuator shown in FIG. 1. The vibration actuator preferably comprises an ultrasonic actuator but is not so limited.

The stator (vibration member) 1 has two elastic members 2, 3 which are formed in the shape of rods, and piezoelectric elements 4, 5. The piezoelectric elements 4, 5 excited by means of drive signals, function as electromechanical converting elements which convert electrical energy into mechanical energy. These piezoelectric elements 4, 5 are disposed in a state where they contact surfaces of the elastic members 2, 3. A drive force is then generated in the driving surface D by means of the primary longitudinal vibration and the primary torsional vibration which arise due to the excitation of piezoelectric elements 4, 5.

The elastic members 2, 3 are elastic members of a configuration such that a thick walled cylindrical member is longitudinally divided in two, but the cylinder is not limited to two equal parts. It is not necessary to form a complete circle when the elastic members 2, 3 have been joined.

The piezoelectric elements 4, 5 comprise a total of four layers. The piezoelectric element 4 having two layers uses a piezoelectric constant $d_{15}$, and is a piezoelectric element for torsional vibration. On the other hand, the piezoelectric element 5, which takes up the remaining two layers, uses a piezoelectric constant $d_{31}$ and is a piezoelectric element for longitudinal vibration.

The elastic members 2, 3, as shown in FIG. 2, have through holes 2b, 3b, respectively, disposed in approximately the middle of the height direction, formed in a direction parallel to the lamination direction of the piezoelectric elements 4, 5. The elastic members 2, 3 are fixed by means of bolts 13, 14, which are fixing members, using these through holes 2b, 3b, respectively. At this time, the piezoelectric elements 4, 5 are interposed between the elastic member 2 and the elastic member 3, and in addition are fixed to the rod-shaped fixed shaft 7. Rod-shaped fixed shaft 7, which is a support member, is inserted into the axial direction center. Moreover, the threaded portions of the bolts 13, 14 are coated with adhesive, which is completely set after they have been tightened.

A moving element 6 is a relative moving member and is formed of a thick walled toroid including a moving member base material 6-1 and a sliding member 6-2, which contacts the driving surface D of the stator 1. Then, by means of a locating member 8 of a bearing, etc., which has been fitted into the inner circumference of moving element 6, moving element 6 is located with respect to the fixed shaft 7.

Moreover, the moving member 6, by means of a compression member 9 which is a disc spring, a coil spring, or a plate spring, etc., contacts the driving surface D of the stator 1 in a compressed state.

The fixed shaft 7 is a support which passes through the hollow portions 2a, 3a formed in the axial direction of the elastic members 2, 3. The stator 1, comprising the elastic members 2, 3, etc., is then fixed, and in addition the moving member 6 is located in the radial direction.

In this embodiment example, the fixed shaft 7, as shown in FIG. 1, is constituted from a first fixed shaft 7a and a second fixed shaft 7b. These fixed shafts 7a, 7b in a position which consists of a plane between the establishment surface R of the bolts 13, 14, which are fixing members, and the driving surface D of the stator 1, for example, are joined by means of screw threaded retention. In this embodiment example, the separation surface S of the fixed shaft 7 has been constituted such as to be positioned between the establishment surface R of the bolts 13, 14 and the driving surface D, but may be positioned in the same plane as the driving surface D. Namely, the separation surface S may be within the range of presence of the support member separation surface as shown in FIG. 1.

Moreover, the fixed shaft 7, in the neighborhood of the portion screw retained by the bolts 13, 14, is thicker and of larger diameter than its other portions. The external circumferential portion of this large diameter portion of shaft 7 is then constructed so as to contact the internal surface portion of the elastic members 2, 3. Because of this, the elastic members 2, 3 and the fixed shaft 7 can easily be brought into uniform contact, and can make the driving noise low when driving.

A threaded portion 7c is formed at the front end of the fixed shaft 7. A nut or the like adjusting member 10 is held by the screw thread on threaded portion 7c, to adjust the compression amount of the compression member 9.

The vibration actuator according to this first embodiment is assembled by the following first through fifth process steps set forth below.

(First Step)

In the periphery of the fixed shaft 7 which has been constructed by screw threaded retention of the first fixed shaft 7a and the second fixed shaft 7b, the elastic members 2,3 are arranged, with four piezoelectric elements 4, 5 in an interposed state. During this, adhesive is coated on the contact portions of the piezoelectric elements 4, 5 and the elastic members 2, 3.

(Second Step)

The elastic members 2, 3 and the piezoelectric elements 4, 5 are fixed and adhered. The elastic members 2, 3 are fixed by means of bolts 13, 14. The elastic members 2, 3 have been located so as to be opposite, with the fixed shaft 7 as the center. Moreover, during this, the positional relationship of the elastic members 2, 3 and the fixed shaft 7 is adjusted such that the rotation axis of the fixed shaft 7 and the central axis of the elastic members 2, 3 become parallel. In this manner, the stator 1 is assembled with the fixed shaft 7 inserted.

(Third Step)

After fixing and adhesion of the elastic members 2, 3 and the piezoelectric element 4, 5, the first fixed shaft 7a is caused to rotate and is withdrawn from the second fixed shaft 7b.

Figure 3:
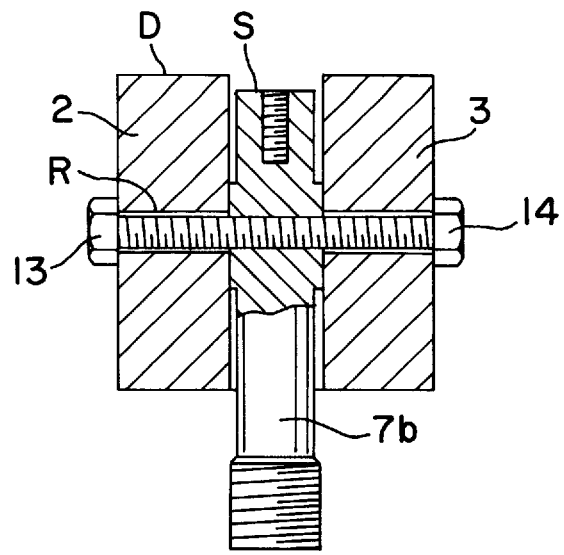
FIG. 3 is a cross sectional drawing showing the positional relationship of an elastic member 1 and a first fixed shaft 7b for the vibration actuator of FIG. 1.

The positional relationship of the stator and the second fixed shaft 7b at this time is shown in FIG. 3. As shown in FIG. 3, the separation surface of the first fixed shaft 7a and the second fixed shaft 7b is present in a position consisting of a plane between the driving surface D and the establishment surface R of the bolts 13, 14, which are fixing members. Because of this, the separation surface S comes to be positioned indented from the driving surface D of the stator 1, and the driving surface D has no obstacle positioned on the same plane.

(Fourth Step)

In this manner, because the driving surface D has no obstacle positioned on the same plane, in its current state, that is, with the second fixed shaft 7b not withdrawn from the stator 1, the driving surface D, for example by lapping or the like, is polished or ground, to be of a predetermined surface roughness.

(Fifth Step) Below, the first fixed shaft 7a, the moving member 6 and the like are mounted on the second fixed shaft 7b.

Proceeding in this manner, the polishing or grinding treatment of the driving surface D of the stator 1 is performed. Because of this, removing and reassembling of the support member 7 after assembly of the stator 1, as in the prior art, does not become necessary during the polishing or grinding treatment of the driving surface D. As a result, it is possible to-perform assembly at a low cost, and in addition, the dimensional accuracy which is maintained in the second process step can be preserved. Moreover, because separation is not necessary after the bolts 13, 14 have been assembled, it becomes unnecessary to coat the threaded portions of the bolts 13, 14 with silicone oil or the like.

Furthermore, by means of the present embodiment, by performing the polishing of the driving surface D with the axis of the fixed shaft 7b as a standard, the perpendicular accuracy between the axis of the fixed shaft 7b and the driving surface D can be increased. Because of this, the phenomenon of the moving element 6 not making uniform contact with the driving surface D of the stator 1, the so-called skewness, is eliminated. As a result, a reduction of the drive force, or of the driving efficiency and the like, can be suppressed. Moreover, noise arising during driving can be suppressed.

Furthermore, by means of the present embodiment, because the elastic members 2, 3 and the piezoelectric elements 4, 5 are fixed by the tightening of the bolts 13, 14, a phenomenon such as the stripping of the piezoelectric elements from the elastic bodies can be prevented. Moreover, the mechanical strength is increased.

Figure 4:
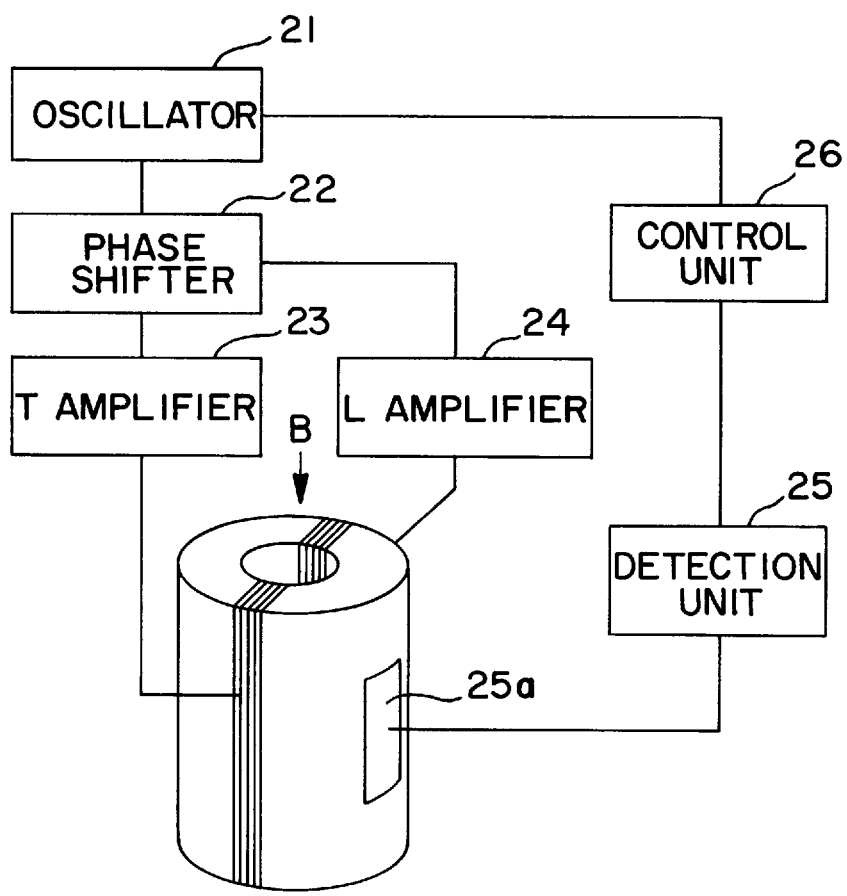
FIG. 4 is a block diagram which illustrates the drive circuit of a vibration actuator according to the first embodiment.

FIG. 4 is a block diagram which illustrates the driving circuit of the vibration actuator according to this embodiment.

The driving circuit of this embodiment example includes an oscillator 21 which generates a drive signal, a phase shifter 22, a T amplifier 23, and an L amplifier 24. The phase shifter 22 divides the drive signal from the oscillator 21 into two signals which have a phase difference of $(\frac{1}{4})\lambda.(\lambda:$ wavelength); one is output to the T amplifier 23, and the other is output to the L amplifier 24. The T amplifier 23 amplifies a drive signal which is input to the piezoelectric element 4 for torsional vibration. Moreover, the L amplifier 24 amplifies a drive signal which is input to the piezoelectric element 5 for longitudinal vibration.

Moreover, a control circuit comprises a detection unit 25 which detects a torsional vibration, and a control unit 26 which controls the frequency, voltage, and the like of the oscillator 21 according to the detection amount of the detection unit 25. The detection unit 25 is equipped with a piezoelectric element 25a affixed to the side surface of the stator 1, and by detection of the deformation which accompanies a torsional vibration, indirectly detects torsional deformations.

The elliptic motion arising in the driving surface by combining the torsional vibration and longitudinal vibration of the elastic body by means of the vibration actuator according to the present embodiment example will next be described.

Figure 5A:
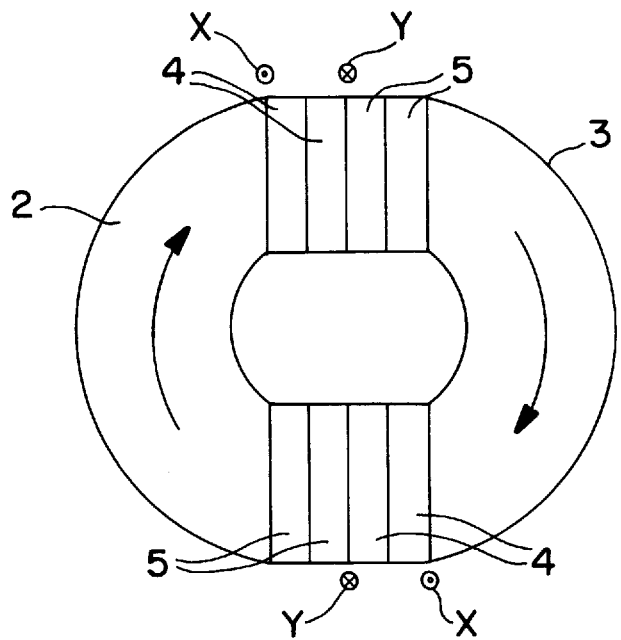
FIG. 5(A) is a diagram of a stator of a vibration actuator, seen from the bottom surface direction, of the first embodiment.
Figure 5B:
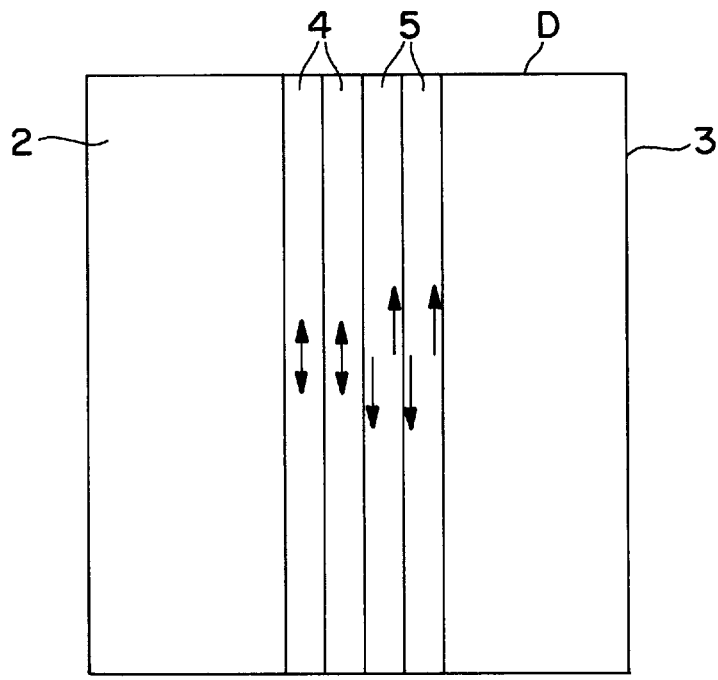
FIG. 5(B) is a diagram of a stator seen from the side.

FIG. 5(A) is a diagram of a stator of the vibration actuator according to this embodiment example, seen from the bottom surface direction. FIG. 5(B) is a diagram of the stator seen from the side.

The piezoelectric elements 4, 5 are formed of two groups which have been interposed between the two elastic members 2, 3. Each group of piezoelectric elements 4, 5 is formed from respectively four layers, two layers made from the piezoelectric element 4 for torsional vibration, using a piezoelectric constant $d_{15}$, and the remaining two layers are made from the piezoelectric element 5 for longitudinal vibration, using a piezoelectric constant $d_{31}$.

The former piezoelectric element 4 brings about the generation of shearing displacement with respect to the length direction of the elastic members 2, 3. In FIG. 5(A), shearing deformation with respect to the circumferential direction is established alternately in the foreground direction X and in the opposite direction Y. At this time, it is suitably set such that the position that maximally deforms in shear on the foreground side becomes point symmetrical, and the position which maximally deforms in shear on its opposite side becomes point symmetrical.

By establishing the piezoelectric element 4 in this manner, when respective shearing displacements occur, torsional displacements are generated in the stator 1, and the driving surface D which is the end surface thereof is twisted.

The piezoelectric element 5, as shown in FIG. 5(B), brings about the generation of expansion and contraction displacements with respect to the length direction of the elastic members 2, 3. The four piezoelectric elements 5, two on each side of the stator, are used for longitudinal vibration in the case of all the impressed displacements. Furthermore, the piezoelectric element 5, is established such as to bring about displacements which arise in the same direction.

In the above manner, in the case that a piezoelectric element 4 for torsional vibration and a piezoelectric element 5 for longitudinal vibration have been established as described, torsional vibrations are generated in the stator 1 by the input of a sine wave voltage into the piezoelectric element 4 for torsional vibration. Moreover, expansion and contraction motions are generated in the stator 1 by the input of a sine wave voltage into the piezoelectric element 5 for longitudinal vibration.

FIGS. 6(A)–6(H) are diagrams that illustrate an elliptic motion brought about in the driving surface by the combination of a longitudinal vibration and a torsional vibration in the elastic member of a vibration actuator according to the present embodiment.

The operation according to time, when driving a vibration actuator 1, will be described here using FIGS. 6(A)–6(H).

As shown in FIG. 6(A), if the phase difference of the period of the torsional vibration and the period of the expansion and contraction motion is $(1/4)\lambda$ ($\lambda$ is the wavelength), elliptic motion arises at the point A on the driving surface D. As the drive frequency f, when the angular frequency of this is considered to be $\omega(=2\pi f)$, at the time point of $t=(6/4)\cdot(\pi/\theta)$, the displacement of the torsional vibration T is a maximum to the left (FIG. 6(G)). On the other hand, the displacement of the longitudinal vibration L is zero. In this state, the moving member 6 is in contact with the driving surface D of the stator 1 due to the compression member 9.

From this state, from $t=(7/4)\cdot(\pi/\theta)$ (FIG. 6(H)) to 0 to $t=(2/4)\cdot(\pi/\theta)$ (FIG. 6(C)), the torsional vibration T displaces from a maximum on the left-hand side to a maximum on the right-hand side. On the other hand, the longitudinal vibration L displaces from zero (FIG. 6(G)) to an upper side maximum (FIGS. 6(H), 6(A), and 6(B)) and again returns to zero (FIG. 6(C)). Accordingly, the point A of the driving surface D of the stator 1, rotates in the right-hand direction while pushing the moving member 6, and the moving member 6 is driven.

Next, from $t=(2/4)\cdot(\pi/\theta)$ (FIG. 6(C)) to $t=(6/4)\cdot(\pi/\theta)$ (FIG. 6(G)), the torsional vibration T displaces from a maximum on the right-hand side (FIG. 6(C)) to a maximum on the left-hand side (FIG. 6(G)). On the other hand, the longitudinal vibration L displaces from zero (FIG. 6(C)) to a lower side maximum (FIGS. 6(D), (E), and (F)) and again returns to zero (FIG. 6(G)). Accordingly, because the point A of the driving surface D of the stator 1 rotates in the left-hand direction while separated from the moving member 6, the moving member 6 is not driven. At this time, the moving member 6, even when compressed by the compression member 9, does not follow the contraction of the stator 1, because the natural frequency is different.

Figure 7:
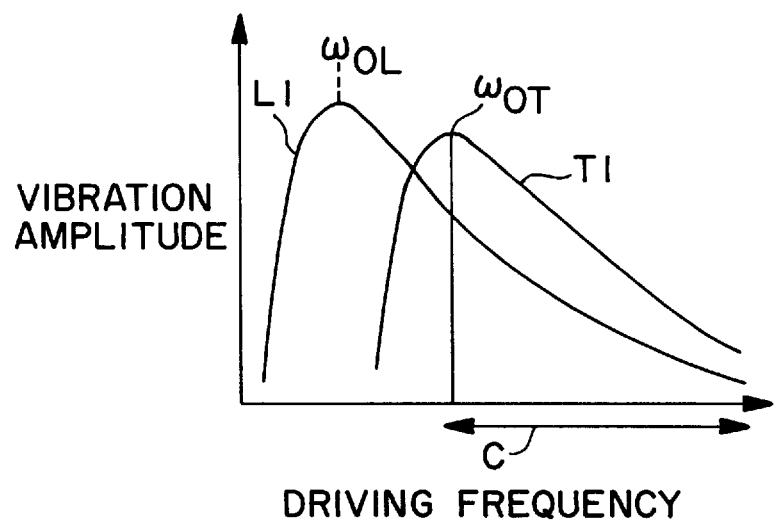
FIG. 7 is a graph showing the relationship of the vibration amplitude and the drive frequency, in the first embodiment.

Here, as shown in FIG. 7, the vibration frequency T1 of this torsional vibration T is caused to approximately coincide with the resonant frequency $\omega_{0T}$ of the torsional vibration, and in addition, the vibration frequency L1 of the longitudinal vibration L is caused to approximately coincide with the resonant frequency $\omega_{0L}$ of the longitudinal vibration, and the elliptic motion enlarges at resonance.

The approximate equations for the resonant frequency $\omega_{0T}$ of the torsional vibration and for the resonant frequency $\omega_{0L}$ of the longitudinal vibration are as shown by Equations (1) and (2).

$$\text{torsional vibration frequency} = Ls \times (G/\rho)^2/2 \tag{1}$$

$$\text{longitudinal vibration frequency} = (Ls+Lr) \times (E/\rho)^2/2 \tag{2}$$

where Ls=length of stator in the length direction, Lr=length of moving member in the length direction, E=longitudinal elastic modulus, G=transverse elastic modulus, $\rho$=density.

In this manner, using Equations (1) and (2), the resonant frequency $\omega_{0T}$ of the torsional vibration and the resonant frequency $\omega_{0L}$ of the longitudinal vibration can be brought into agreement by adjusting the length of the stator 1 in the length direction.

Moreover, in the present embodiment, the length of the stator 1 in the length direction is adjusted beforehand so that the resonant frequency $\omega_{0T}$ of the torsional vibration becomes higher than the resonant frequency $\omega_{0L}$ of the longitudinal vibration.

The operation of the vibration actuator of the present embodiment will be described next.

In FIG. 4, the oscillator 21 generates a drive signal, and the phase shifter 22 divides the drive signal into two signals which have a phase difference of $(1/4)\lambda$ ($\lambda$: wavelength); these are respectively amplified by the T amplifier 23 and the L amplifier 24.

The drive signal amplified by the T amplifier 23 is input to the piezoelectric element 4 for torsional vibration, and the drive signal amplified by the L amplifier 24 is input to the piezoelectric element 5 for longitudinal vibration. The longitudinal vibration is directly generated by the piezoelectric element 5 for longitudinal vibration, but the torsional vibration is generated by means of the shearing deformation of the piezoelectric element 4 for torsional vibration.

However, as regards the structure of the moving member 6, because the thickness in the direction of the axis of rotation is not large, there are cases in which the amplitude of the torsional vibration becomes small with respect to the longitudinal vibration. Accordingly, it is suitable if the amplification factor of the T amplifier 23 is made larger than that of the L amplifier 24, so that the difference of the amplitude of the torsional vibration and the amplitude of the longitudinal vibration becomes small.

The stator 1, by means of the excitation of the piezoelectric elements 4, 5 in the case that drive signals are input, generates first order torsional vibrations and first order longitudinal vibrations, and when these vibrations are combined, an elliptic motion occurs in the driving surface D. The moving member 6 is driven, because it is compressed onto the driving surface D, and a drive force is frictionally transmitted from the stator 1.

The detection unit 25 detects the amplitude of the torsional vibration of the stator 1, and outputs the information to the control unit 26. The drive speed or drive torque of the moving element 6 can be assumed from the amplitude value of the stator 1. Accordingly, the control unit 26, based on the detection result of the detection unit 25, controls the drive frequency or voltage of the vibrator of the oscillator 21.

The control unit 26 performs control, for example by increasing the driving frequency and reducing the voltage, in a case in which the detection amount is greater than a predetermined value. Also, the control unit 26 performs control by decreasing the driving frequency and increasing the voltage, in a case in which the detection amount is smaller than a predetermined value.

In the present embodiment, because the resonant frequency of the first order torsional vibration is higher than the resonant frequency of the first order longitudinal vibration, the amplitude of the first order torsional vibration and the amplitude of the first order longitudinal vibration become as shown in FIG. 7.

The longitudinal vibration plays a clutch-like role between the stator 1 and the moving member 6. The torsional vibration plays a role which confers rotational force on the moving member 6. Accordingly, if controlled by a drive frequency region, which is a frequency region higher than the resonant frequency of the torsional vibration, the rotational speed and drive torque can be controlled. Because the resonance point $\omega_{OL}$ of the longitudinal vibration is not present within this drive frequency region C, stabilized driving is obtained, and the driving force or driving efficiency can be increased.

Moreover, when comparing the design methods to bring about agreement of the resonant frequency of the longitudinal vibration and the resonant frequency of the torsional vibration, there is the following advantage. Namely, with the prior art method, due to process tolerances, the final result is either the resonant frequency of the longitudinal vibration becoming smaller than the resonant frequency of the torsional vibration, or the resonant frequency of the longitudinal vibration becoming larger than the resonant frequency of the torsional vibration. In particular, in the latter case, the resonance point of the longitudinal vibration is present in the drive frequency region, which is a case in which stabilized driving is not obtained, and variability in performance arose due to the process tolerances.

However, as in the present embodiment, if the design is such that the resonant frequency of the longitudinal vibration becomes smaller than the resonant frequency of the torsional vibration, even if in a direction, in which the difference of the resonant frequencies of the longitudinal vibration and torsional vibration is reduced, stabilized driving performance can be obtained due to the process tolerances. Thus, individual differences of performance due to process tolerances can be made smaller than in the prior art.

At this time, the amplitude of the longitudinal vibration is generated much larger than the amplitude of the torsional vibration. Even if the resonant frequency of the longitudinal vibration and the resonant frequency of the torsional vibration are to some degree separated, an elliptic motion can be generated in the driving surface D, and can drive the moving element 6.

Figure 8:
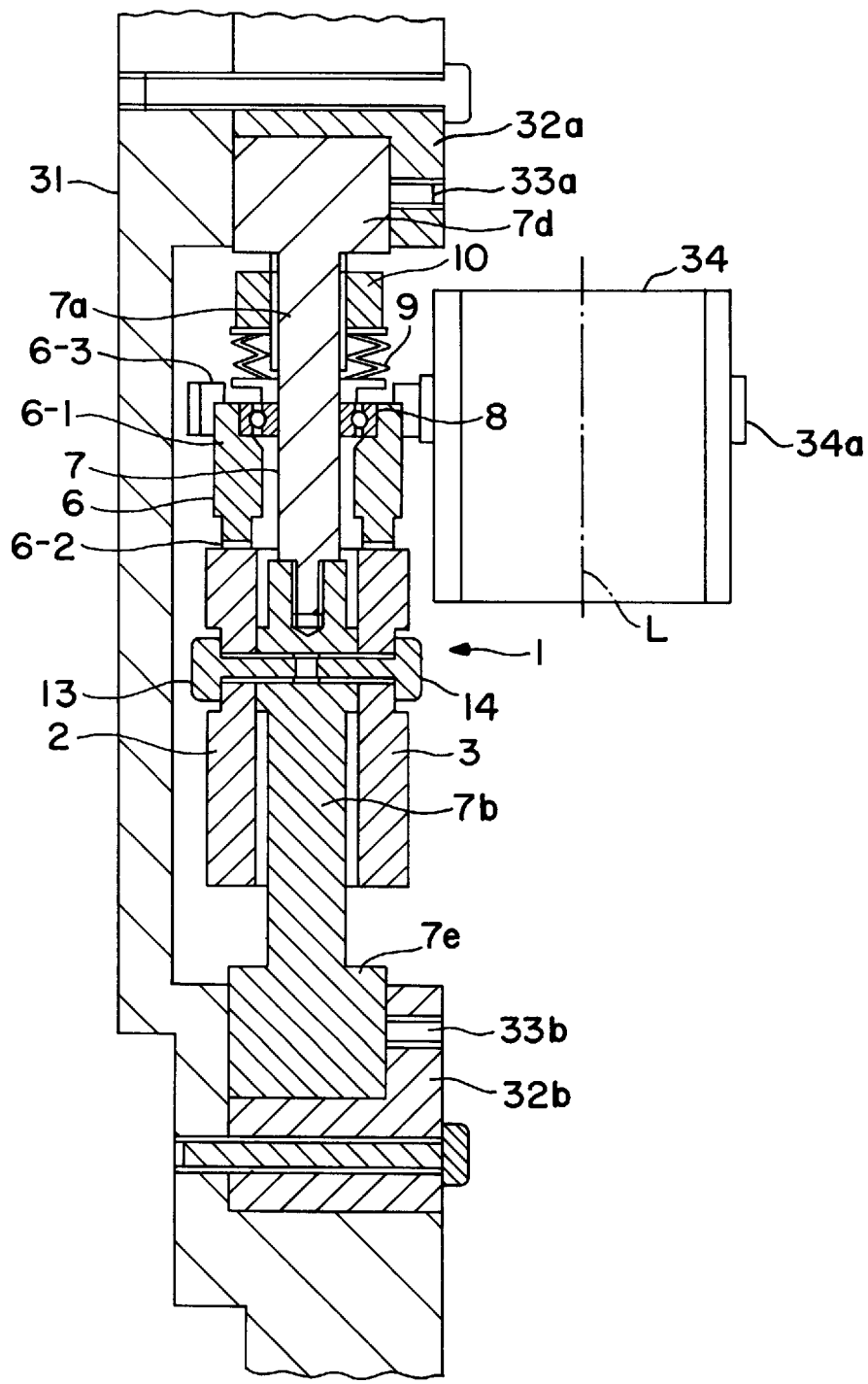
FIG. 8 is a cross sectional drawing showing the whole assembled drive device of the vibration actuator of the first embodiment.

FIG. 8 is a cross sectional drawing showing the structure of an assembled drive device of a vibration actuator according to the first embodiment.

The stator 1 is equipped with a moving element 6, a fixed shaft 7 and the like supporting these. In addition, the fixed shaft 7 is separated into a first portion 7a and a second portion 7b. The vibration actuator shown in FIG. 1, for example, is maintained by means of an equipment fixing unit 31 forming a cylindrical portion such as a fixed tube of a lens barrel for a camera.

Portions 7d, 7e which are thicker than other portions of fixed shaft 7 are formed at both ends thereof of the vibration actuator, in order to maintain support members. These thicker portions 7d, 7e are then mounted in holding members 32a, 32b which are disposed in opposite surfaces of the equipment fixing unit 31, and by fixing with set screws 33a, 33b, the vibration actuator is maintained by means of the equipment fixing unit 31.

In the outer edge portion of the side of the moving element 6 opposite the elastic member, a threaded portion 6-3 is disposed on the base portion 6-1 of the vibration actuator. The threaded portion 6-3 is formed in an annular shape. A threaded portion 34a is disposed on the outer circumference of a tubular driven member 34. A shaft supported by means of a support structure (not shown in the drawing) with the rotation axis L as a center is in engagement with this threaded portion 6-3.

Driving the vibration actuator, the moving member base portion 6-1 rotates, and the driven member 34 is driven via the threaded portion 6-3 disposed on the outer edge portion of the moving member base portion 6-1 and the threaded portion 34a disposed in the outer circumference of the driven member 34.

At this time, in the vibration actuator of the present embodiment, because the fixed shaft 7 is divided into two pieces, thick portions 7d, 7e are disposed so as to have no relationship to the diameter of the stator 1 or of the moving member 6, and shaft 7 can be fixed to the equipment fixing unit 31 via the portions 7d, 7e.

Because of this, the fixed shaft 7 can be very reliably fixed to the equipment fixing unit 31. Moreover, increasing the fixing torque of the fixed shaft 7 (fixing force of the set screws 33a, 33b×radius of portions 7d, 7e) causes, even during driving, the vibration of the fixed shaft 7 to be reduced, and stabilized driving can be accomplished.

Second Embodiment

Figure 9:
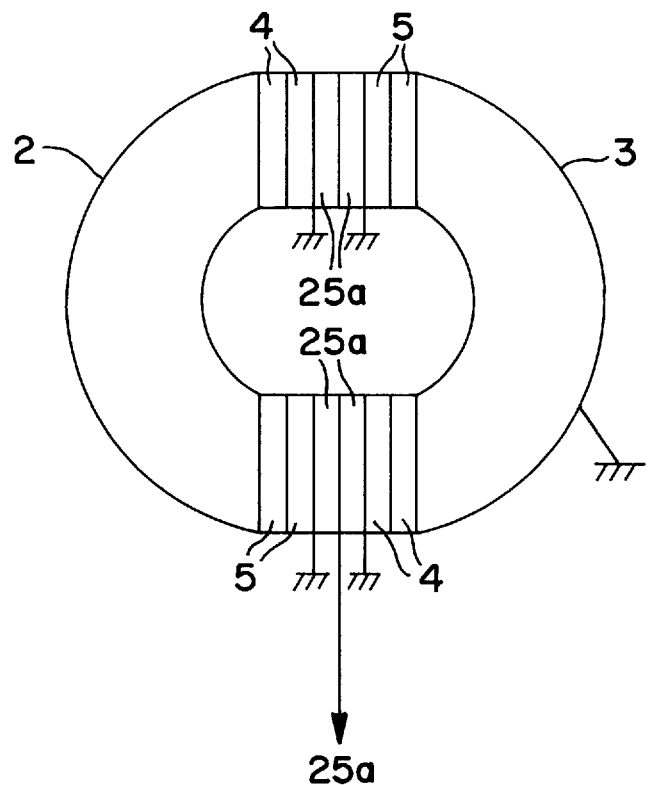
FIG. 9 is an illustrative diagram showing a piezoelectric element according to a second embodiment of the present invention.

FIG. 9 shows the construction of a second embodiment of a vibration actuator according to the present invention, which is a modification of the first embodiment. Moreover, in describing each embodiment example hereinafter, the same parts are given the same symbols, and duplication of descriptions is omitted.

In the first embodiment, an example is described in which a piezoelectric element 25 for detection is affixed to the side surface of the elastic member 2 or 3, but the affixing position is not limited to the side surfaces of the elastic members 2 or 3. As shown in FIG. 9, piezoelectric element 25 may be disposed between the piezoelectric elements 4, 5.

Third Embodiment

Figure 10:
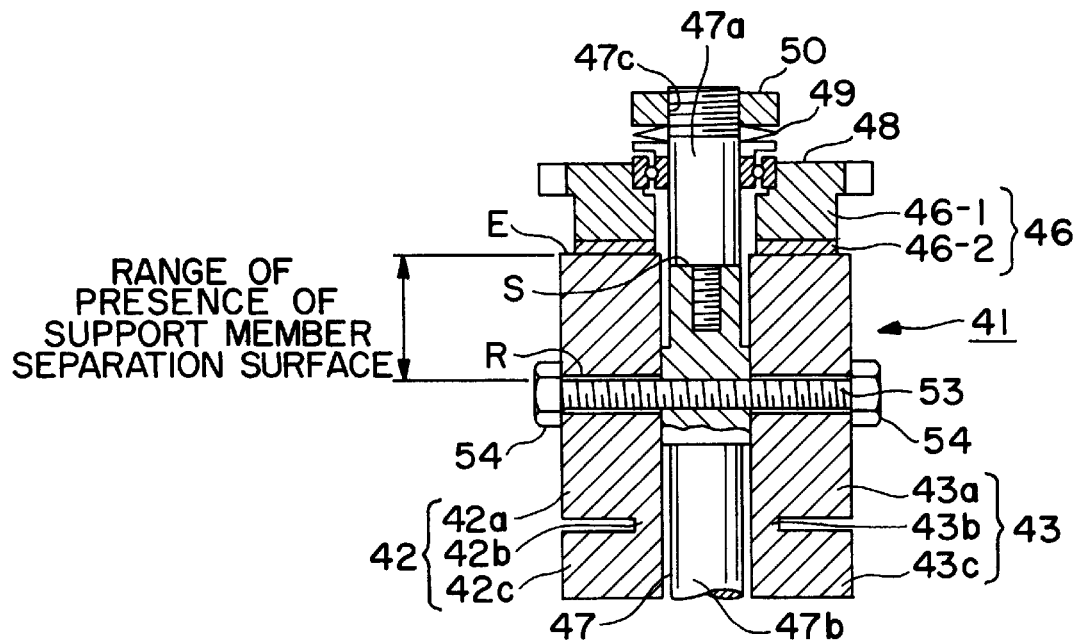
FIG. 10 is a cross sectional drawing showing a third embodiment of a vibration actuator according to the present invention.

FIG. 10 is a cross sectional drawing which illustrates a third embodiment of a vibration actuator according to the present invention.

A stator 41 is constructed from two elastic members 42, 43 which have been formed in rod shapes, and piezoelectric elements 44, 45. The piezoelectric elements 44, 45 are excited by means of drive signals, and function as electromechanical converting elements which convert electrical energy into mechanical energy. These piezoelectric elements 44, 45 are arranged in an interposed state in the joint surface of the elastic members 2, 3. By means of the production of a first order longitudinal vibration and a second order torsional vibration by the excitation of these piezoelectric elements 44, 45, drive force is then generated in the driving surface E.

The elastic members 42, 43 are members configured such that they are thick walled cylinders which have been longitudinally divided in two and have first large diameter portions 42a, 43a, and second large diameter portions 42c, 43c, and small diameter portions 42b, 43b formed therebetween, with piezoelectric elements 44, 45 interposed at their division surface. Moreover, the elastic members 42, 43, are not limited to cylinders divided into two equal parts, and it is not necessary for the step surface to form a completely circular shape when the elastic members 42, 43 have been joined.

The length of the first large diameter portions 42a, 43a becomes longer than the second large diameter portions 42c, 43c. The piezoelectric elements 44, 45 form a total of four layers. The piezoelectric element 44 having two layers is a piezoelectric element for torsional vibration, using a piezoelectric constant $d_{15}$, and the piezoelectric element 45 occupying the remaining two layers is a piezoelectric element for longitudinal vibration, using a piezoelectric constant $d_{31}$.

The elastic members 42, 43 have through holes formed in approximately the middle of the height direction, in a direction parallel to the lamination direction of the piezoelectric elements 44, 45. The elastic members 42, 43 are fixed by means of bolts 53, 54, using these through holes. The piezoelectric elements 44, 45 are interposed, and in addition are fixed to a rod-shaped fixed shaft 47 which is inserted into the axial direction center.

A moving member 46 is constructed from the moving member base member 46-1, and a sliding member 46-2 which contacts the driving surface E of the elastic member 41. The position of moving member 46 is set with respect to the fixed shaft 47 by means of a position setting member 48 by means of bearings and the like which were fitted into the inner circumferential portion of moving member 46.

Moreover, the moving member 46, by means of a compression member 49 which is a disc spring, a coil spring, or a plate spring, etc., contacts the driving surface E of the stator 41 in a compressed state.

The fixed shaft 47, as aforementioned, is constructed from the screw threaded coupling of a first portion 47a and a second portion 47b. Shaft 47 then penetrates hollow portions formed in the axial direction of the elastic members 42, 43, and fixes the stator 41, which includes the elastic members 42, 43, etc. Furthermore, shaft 47 sets the position of the moving member 46 in the radial direction. This fixed shaft 47 has a threaded portion 47c formed at the front end, and a nut or the like adjustment member 50, which adjusts the compression amount of the compression member 49, is screwed on.

Figure 11A:
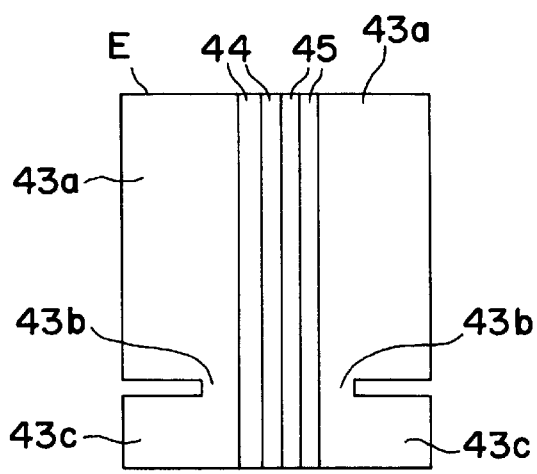
FIGS. 11(A) and 11(B) are diagrams showing a primary longitudinal vibration and a secondary torsional vibration arising due to excitation of a piezoelectric element for the embodiment shown in FIG. 10.
Figure 11B:
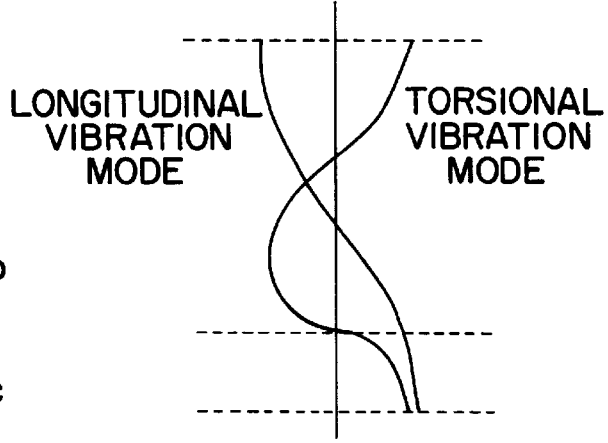

FIGS. 11(A) and 11(B) are diagrams illustrating the occurrence of first order longitudinal vibration and second order torsional vibration by means of excitation of the piezoelectric elements 44, 45.

The principle of generation of torsional vibration and longitudinal vibration is similar to that described for the first embodiment. However, the elastic members 42, 43 of the present embodiment have small diameter portions 42b, 43b, of weak torsional rigidity, between the first large diameter portions 42a, 43a and the second large diameter portions 42c, 43c. Furthermore, the first large diameter portions 42a, 43a are longer than the second large diameter portions 42c, 43c. Accordingly, the torsional vibration consists of a second order mode, with two nodes arising in the middle of the small diameter portions 42b, 43b and first large diameter portions 42a, 43a.

On the other hand, because the effect of the configuration due to the small diameter portions 42b, 43b is difficult to receive, the longitudinal vibration becomes a first order mode, with one node in the middle of the length which includes the first large diameter portions 42a, 43a and the second large diameter portions 42c, 43c and small diameter portions 42b, 43b. In this case, the driving surface E becomes an antinode of the vibration, the amplitude of both the torsional vibration and the longitudinal vibration becoming large.

Figure 12:
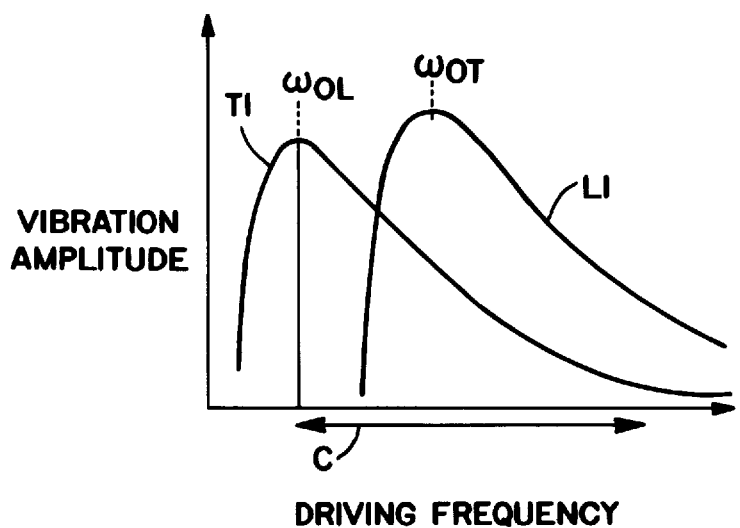
FIG. 12 is a graph showing the relationship of the vibration amplitude and the drive frequency in the second embodiment.
Figure 13:
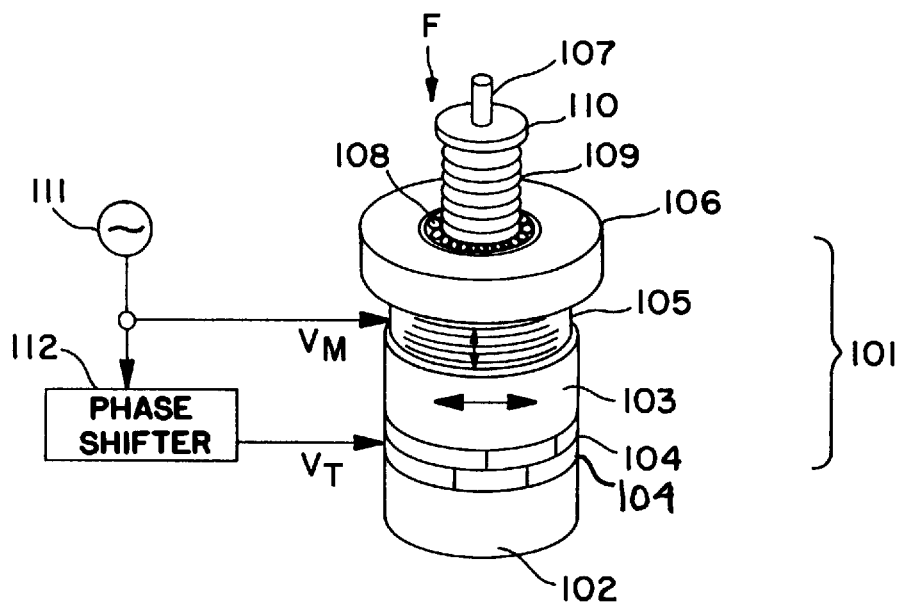
FIG. 13 is an oblique diagram showing a prior art example of a longitudinal-torsional vibration type of ultrasonic actuator.
Figure 14:
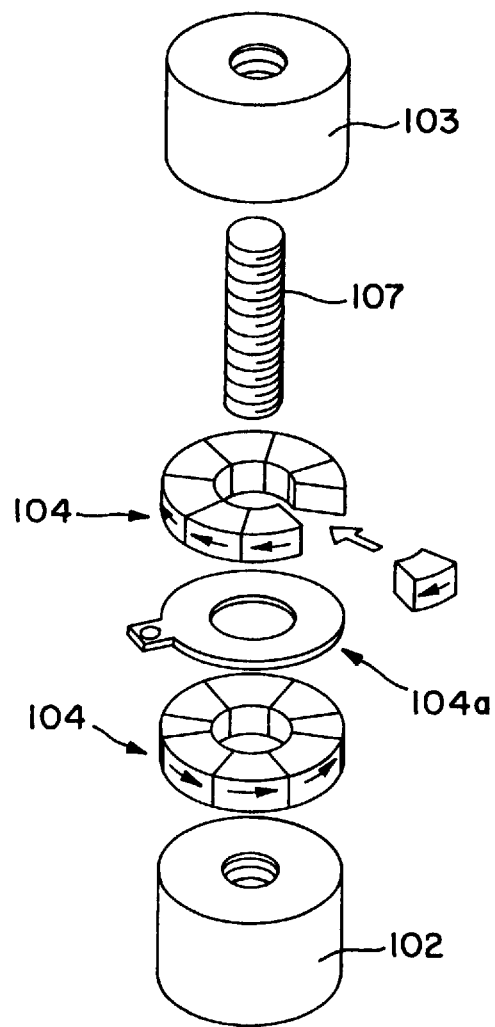
FIG. 14 is an oblique exploded diagram showing the stator of an ultrasonic actuator according to the prior art.
Figure 15:
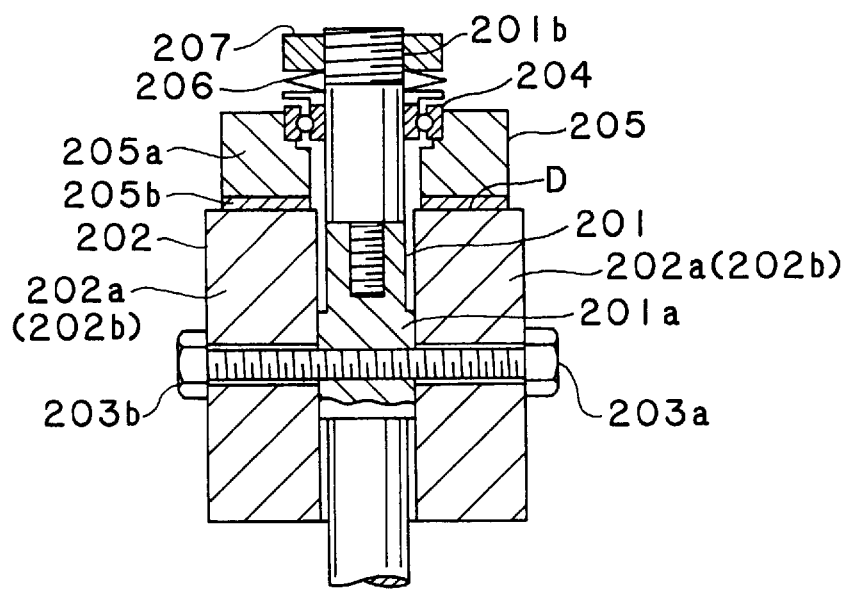
FIG. 15 is a cross sectional drawing showing the structure of an ultrasonic actuator proposed in Japanese Patent Application 6-275022.

In this kind of vibration actuator, the change of the resonant frequency of the longitudinal vibration is larger than the change of the resonant frequency of the torsional vibration, with respect to the change of the length of the second large diameter portions 42c, 43c. Accordingly, the resonant frequency $\omega_{0T}$ of the torsional vibration T and the resonant frequency $\omega_{0L}$ of the longitudinal vibration can be brought into agreement by changing the length of the second large diameter portions 42c, 43c, as shown in the graph of FIG. 12. Moreover, the resonant frequency $\omega_{0T}$ of the torsional vibration T can be made higher than the resonant frequency $\omega_{0L}$ of the longitudinal vibration.

The operation of the vibration actuator of the present embodiment will be described next. Moreover, the driving circuit is similar to the driving circuit of the first embodiment shown in FIG. 4.

The oscillator 21 generates a drive signal, and the phase shifter 22 divides the drive signal into two signals which have a phase difference of $(\frac{1}{4})\lambda.(\lambda:$ wavelength). These are respectively amplified by the T amplifier 23 and the L amplifier 24. The drive signal amplified by the T amplifier 23 is input to the piezoelectric element 44 for torsional vibration, and on the other hand, the drive signal amplified by the L amplifier 24 is input to the piezoelectric element 45 for longitudinal vibration. The elastic member 41, in the case that a drive signal has been input, by means of the excitation of the piezoelectric elements 44, 45, gives rise to a first order longitudinal vibration and a second order torsional vibration, and an elliptic motion arises in the driving surface E due to the combination of these vibrations. The moving member 46 is driven, because it is compressed on the driving surface E of the elastic member 41, the driving force being frictionally transmitted from the elastic member 41.

In the present embodiment, also, the fixed shaft 47 is divided into the first portion 47a and the second portion 47b, and because the division surface S is located between the driving surface E and the surface R where the bolts 53, 54 are established, a similar effect to that of the first embodiment is obtained.

Moreover, in the present embodiment, only the elastic member 41 can set the resonant frequency of the torsional vibration and the resonant frequency of the longitudinal vibration. Because of this, it is an advantage that the form of the moving member 46 can be set freely. Because of this, it is necessary to make the propagation of vibration from the elastic member 41 to the moving member 46 small. For example, the sliding member 46-2 having a large vibration attenuation is used, being made from a material having a large attenuation in the moving member base portion 46-1, the vibration attenuation of the moving member 46 itself may be made large.

Various modifications and alterations are possible to the embodiments described hereinabove in accordance with the invention.

For example, in the embodiments which have just been described, piezoelectric elements are used as the electromechanical converting elements, but the present invention is not so limited, and these elements may be replaced by anything which converts electrical energy into mechanical energy. For example, electrostrictive or magnetostrictive elements and the like can be used.

Moreover, in the present embodiments, a method has been used which detects vibration by means of the piezoelectric element 4, 5 disposed in the stator 1.

Moreover, in the present embodiments, a method has been used which detects vibration by means of the piezoelectric element 4, 5 disposed in the stator 1. However, the detection result may be transmitted to the control unit 26, detecting the direct rotation number by means of an encoder and the like.

In the present embodiments, the cases in which a first order torsional vibration mode and a first order longitudinal vibration mode are generated (first and second embodiments), and the case in which a second order torsional vibration mode and a first order longitudinal vibration mode are generated (third embodiment), have been described. However, similar effects also arise in cases such that a first or greater order torsional vibration mode and a first or greater order longitudinal vibration mode arise in the elastic member.

Although a few preferred embodiments of the present invention have been shown and described, it would be appreciated by those skilled in the art that changes may be made in the embodiments without departing from the principles and spirit of the invention, the scope of which is defined in the claims and their equivalents.

What is claimed is:

1. A vibration actuator, comprising:
   a rod shaped support member having an outer surface;
   an elastic member disposed on the outer surface of the support member, to cause generation of a driving force in a driving surface which is an end surface of the elastic member;
   an electromechanical converting element which converts electrical energy into mechanical energy, and which is supported by the elastic member;
   a relative moving member which contacts in a compressed state the driving surface of the elastic member; and
   a fixed member which fixes the support member and the elastic member, ber, and penetrates the support member and the elastic member;
   wherein the support member is freely separated into at least two pieces, in a position including a plane containing the driving surface, or in a position in a plane between the driving surface and the fixed member.

2. A vibration actuator as claimed in claim 1, wherein
   the elastic member includes a plurality of rod-shaped elastic members which have been joined together at joint surfaces; and
   at least a portion of the electromechanical converting element is of a thin plate shape, and is set up in a state interposed in the joint surfaces of the elastic member.

3. A vibration actuator as claimed in claim 1, wherein the driving force is generated in the driving surface, by the generation in the elastic member of at least a first order longitudinal vibration and at least a first order torsional vibration, by means of excitation of the electromechanical converting element.

4. A vibration actuator as claimed in claim 1, wherein respective end portions of the two pieces of the support member are formed thicker than other portions of the at least two pieces.

5. A vibration actuator, comprising:
   a support member, said support member including a first member and a second member;
   a plurality of piezoelectric elements;
   an elastic member attached to the second member, the elastic member being formed from a plurality of pieces joined at joining faces by the plurality of piezoelectric elements, the piezoelectric elements being disposed between respective joining faces;
   a fixing member to fix the elastic member to the supoort member; and
   a moving member disposed on a drive surface of the elastic member so as to move in response to longitudinal and torsional vibrations in the elastic member, wherein
   said fixing member penetrates said support member and said elastic member.

6. A vibrational actuator as claimed in claim 5, wherein the second member includes an accepting surface for accepting the first member, the accepting surface being one of in a plane containing the drive surface and in a plane between the plane containing the drive surface and a plane bisecting the attachment of the second member to the elastic member.

7. A vibrational actuator as claimed in claim 5, wherein the elastic member undergoes a first order longitudinal vibration and a first order torsional vibration when the piezoelectric elements are driven by an exterior source.

8. A vibrational actuator as claimed in claim 5, wherein the elastic member is divided into a first section, a second section, and a third section, the third section being between the first and second sections and having a smaller diameter than that of the first and second sections.

9. A vibrational actuator as claimed in claim 8, wherein the elastic member undergoes a first order longitudinal vibration and a second order torsional vibration when the piezoelectric elements are driven by an exterior source.

10. A method of producing vibrations in a vibrational actuator that includes a fixed shaft formed of a first and a second fixed shaft, a moving member, an elastic member formed of at least two members, each having a first section, a second section and a third section, and a plurality of piezoelectric elements, said method comprising the steps of:
    joining the fixed shaft to the elastic member by a fixing member that penetrates said fixed shaft and said elastic member; and
    generating first order longitudinal vibrations and second order torsional vibrations in the elastic member by applying an electric force to the plurality of piezoelectric elements.

11. A vibration actuator comprising:
    a support member having at least two parts;
    an elastic member disposed around an outer peripheral surface of said support member; and
    at least one fixing member to fix the elastic member to the support member, said fixing member penetrating said support member and said elastic member.

12. A vibration actuator according to claim 11, further comprising:
an electromechanical converting element that converts electrical energy into mechanical energy, and which is supported by said elastic member; and
a relative moving member that contacts, in a compressed state, a driving surface of the elastic member, which is an end surface of the elastic member.

13. A vibration actuator according to claim 12, wherein said support member is freely separated into the at least two parts in a position including a plane containing the driving surface, or in a position in a plane between the driving surface and the fixing member.

14. A vibration actuator according to claim 11, wherein
the elastic member includes a plurality of rod-shaped elastic members which have been joined together at joint surfaces.

15. A vibration actuator according to claim 12, wherein
the elastic member includes a plurality of rod-shaped elastic members which have been joined together at joint surfaces, and
at least a portion of the electromechanical converting element is of a thin plate shape, and is set up in a state interposed in the joint surfaces of the elastic member.

16. A vibration actuator according to claim 12, wherein the elastic member includes a plurality of rod-shaped elastic members which have been joined together at joint surfaces.

17. A vibration actuator according to claim 12, wherein a driving force is generated in the driving surface, by the generation in the elastic member of at least a longitudinal vibration and at least a torsional vibration, by excitation of the electromechanical converting element.

18. A vibration actuator according to claim 11, wherein said at least two parts of said support member are formed thicker at respective end portions thereof than at other portions thereof.

* * * * *

UNITED STATES PATENT AND TRADEMARK OFFICE
CERTIFICATE OF CORRECTION

PATENT NO.: 5,869,917
DATED : February 9, 1999
INVENTOR(S): Takatoshi Ashizawa

It is certified that error appears in the above-identified patent and that said Letters Patent is hereby corrected as shown below:

Column 15, line 54, (claim 1), delete "ber,";

Item [56]
Title Page, "OTHER PUBLICATIONS" change "08/391,464" to --08/391,565--.

Signed and Sealed this

Tenth Day of August, 1999

Attest:

Q. TODD DICKINSON

*Attesting Officer*  *Acting Commissioner of Patents and Trademarks*